US009009260B2

(12) United States Patent
Ewanchuk et al.

(10) Patent No.: US 9,009,260 B2
(45) Date of Patent: Apr. 14, 2015

(54) METHOD, SYSTEM AND APPARATUS FOR TRANSFERRING DATA VIA MORE THAN ONE COMMUNICATIONS INTERFACE

(75) Inventors: Andrew John Ewanchuk, Baden (CA); Darrell Reginald May, Waterloo (CA); Graham Russell, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 362 days.

(21) Appl. No.: 13/468,192

(22) Filed: May 10, 2012

(65) Prior Publication Data

US 2013/0304847 A1 Nov. 14, 2013

(51) Int. Cl.
*G06F 15/16* (2006.01)
*H04L 29/08* (2006.01)
*H04L 29/14* (2006.01)

(52) U.S. Cl.
CPC ............ *H04L 67/06* (2013.01); *H04L 67/1023* (2013.01); *H04L 69/40* (2013.01)

(58) Field of Classification Search
None
See application file for complete search history.

(56) References Cited

U.S. PATENT DOCUMENTS

| 8,095,099 | B2 | 1/2012 | Patel et al. | |
|---|---|---|---|---|
| 2005/0091357 | A1* | 4/2005 | Krantz et al. | 709/223 |
| 2005/0238046 | A1* | 10/2005 | Hassan et al. | 370/465 |
| 2007/0097877 | A1* | 5/2007 | Hoekstra et al. | 370/252 |
| 2007/0127386 | A1 | 6/2007 | Joshi et al. | |
| 2007/0255797 | A1* | 11/2007 | Dunn et al. | 709/217 |
| 2008/0016201 | A1* | 1/2008 | Thompson | 709/223 |
| 2011/0116405 | A1 | 5/2011 | Coppage et al. | |
| 2012/0254464 | A1* | 10/2012 | Armstrong et al. | 709/238 |

FOREIGN PATENT DOCUMENTS

| EP | 2378734 A1 * | 10/2011 |
|---|---|---|
| WO | 2005062652 A1 | 7/2005 |

OTHER PUBLICATIONS

Corresponding European Patent Application No. 12167567.2 Search Report dated Aug. 20, 2012.

* cited by examiner

*Primary Examiner* — Lisa Lewis
*Assistant Examiner* — Henry Tsang
(74) *Attorney, Agent, or Firm* — Perry + Currier, Inc.

(57) ABSTRACT

A method system and apparatus for transferring data via more than one communications interface are provided. A data file is transferred, at a processor of a device, and via at least one communications network, on a first communications interface of the device and a second communications interface of the device, the second communications interface different from the first communications interface.

20 Claims, 8 Drawing Sheets

METHOD, SYSTEM AND APPARATUS FOR TRANSFERRING DATA VIA MORE THAN ONE COMMUNICATIONS INTERFACE

FIELD

The specification relates generally to mobile electronic devices, and specifically to a method, system and apparatus for transferring data via more than one communications interface.

BACKGROUND

The evolution of computers is currently quite active in the mobile device environment. It is now well-known to include calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

An aspect of the specification provides a device comprising: a processor, a first communications interface, and a second communications interface different from the first communications interface, the processor enabled to: transfer a data file via at least one communications network on the first communications interface and the second communications interface.

The processor can be further enabled to manage the transfer of the data file on the first communications interface and the second communications interface at an application layer of the device.

The processor can be further enabled to process an application for managing the transfer of the data file on the first communications interface and the second communications interface.

The processor can be further enabled to transfer the data file on the first communications interface and the second communications interface by transferring respective chunks of the data file via the first communications interface and the second communications interface. The transfer of the data file can comprise an upload of the data file to a target device via the communications network and the processor can be further enabled to break the data file into the respective chunks. The transfer of the data file can comprise a download of the data file from at least one remote device via the communications network and the processor can be further enabled to: assemble the respective chunks from the first communications interface and the second communications interface into the data file.

The processor can be further enabled to: first transfer the data file on one of the first communications interface and the second communications interface until a respective threshold transfer rate is reached; and, then transfer the data file on the first communications interface and the second communications interface. The processor can be further enabled to determine which of the first communications interface and the second interface to first transfer the data file based on one or more of: a priority list of communications interfaces stored at a memory of the device; respective quality of service (QOS) metrics associated with each of the first communications interface and the second communications interface; respective speeds of transfer associated with each of the first communications interface and the second communications interface; and, respective costs of transfer associated with each of the first communications interface and the second communications interface.

The device can further comprise at least one further communications interface, and the processor can be further enabled to transfer the data file on two or more of the first communications interface, the second communications interface, and the at least one further communications interface.

Each of the first communications interface, and the second communications interface can comprise a respective radio.

The transfer of the data file can comprise a torrent protocol.

A further aspect of the specification provides a method comprising: transferring a data file, at a processor of a device, and via at least one communications network on a first communications interface of the device and a second communications interface of the device, the second communications interface different from the first communications interface.

The method can further comprise managing, at the processor, the transfer of the data file on the first communications interface and the second communications interface at an application layer of the device The method can further comprise processing, at the processor, an application for managing the transfer of the data file on the first communications interface and the second communications interface.

The method can further comprise transferring, via the processor, the data file on the first communications interface and the second communications interface by transferring respective chunks of the data file via the first communications interface and the second communications interface. The transfer of the data file can comprise an upload of the data file to a target device via the communications network and the method can further comprise breaking the data file into the respective chunks. The transfer of the data file can comprise a download of the data file from at least one remote device via the communications network and the method can further comprise assembling the respective chunks from the first communications interface and the second communications interface into the data file.

The method can further comprise: first transferring, via the processor, the data file on one of the first communications interface and the second communications interface until a respective threshold transfer rate is reached; and, then transferring, via the processor, the data file on the first communications interface and the second communications interface. The method can further comprise determining, at the processor, which of the first communications interface and the second interface to first transfer the data file based on one or more of: a priority list of communications interfaces stored at a memory of the device; respective quality of service (QOS) metrics associated with each of the first communications interface and the second communications interface; respective speeds of transfer associated with each of the first communications interface and the second communications interface; and, respective costs of transfer associated with each of the first communications interface and the second communications interface The method can further comprise transferring, via the processor, the data file on two or more of the first communications interface, the second communications interface, and at least one further communications interface of the device.

The transfer of the data file can comprise a torrent protocol.

Figure 1:
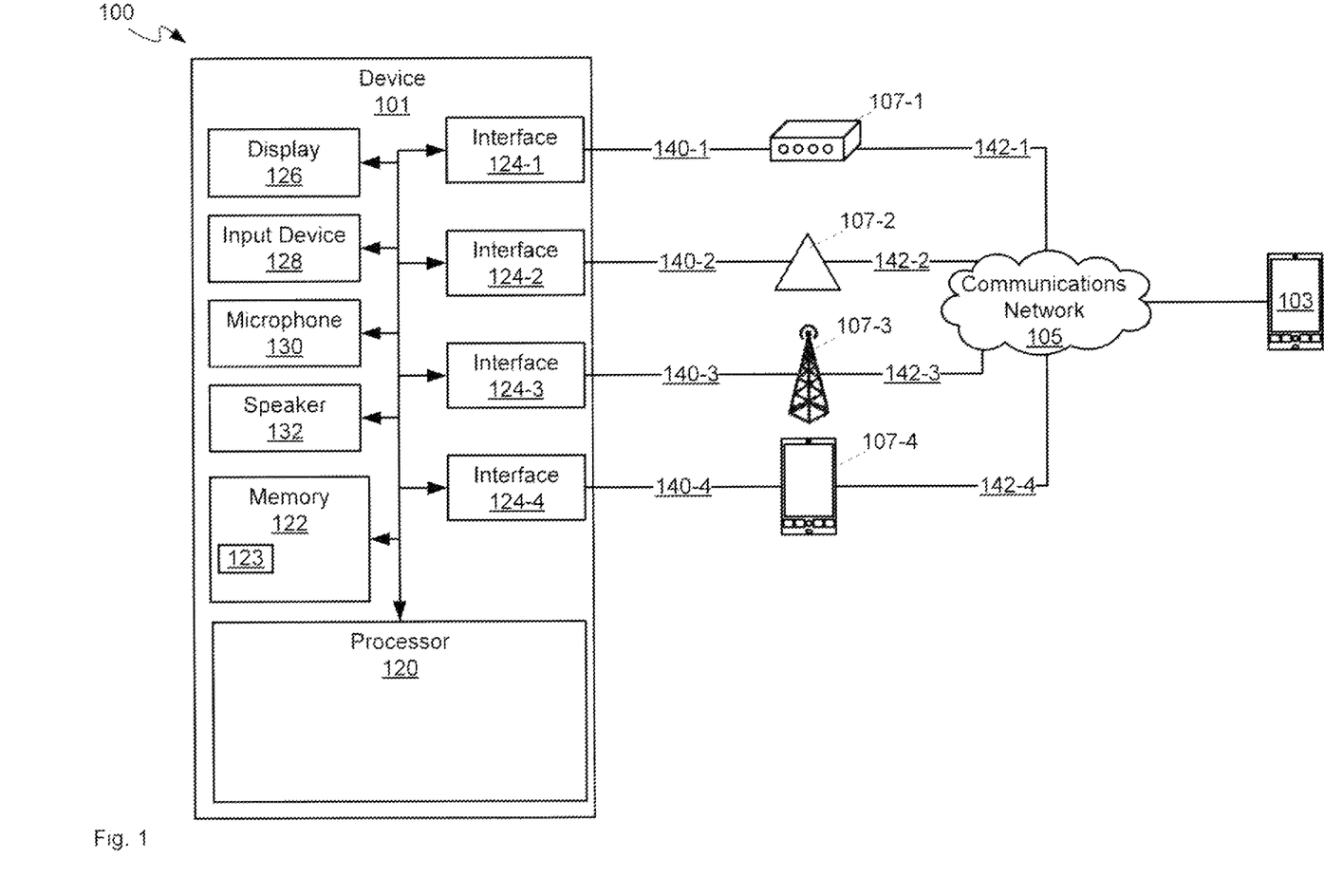
FIG. 1 depicts a system for transferring data via more than one communications interface, according to non-limiting implementations.

FIG. 1 depicts a system 100 comprising a first device 101 in communication with a second device 103 via at least one communications network 105 and a plurality of access points 107-1, 107-2, 107-3, 107-4 to the at least one communications network 105, according to non-limiting implementations. First device 101 will be interchangeably referred to hereafter as device 101 and second device will be interchangeably referred to hereafter as device 103. The at least one communications network 105 will be interchangeably referred to hereafter as network 105. Access points 107-1, 107-2, 107-3, 107-4 will be referred to hereafter generically as an access point 107, and collectively as access points 107. This convention will be used elsewhere in the present disclosure. Further, it is appreciated that while four access points 107 are depicted, any suitable number of access points 107 is within the scope of present implementations, including two or more access points 107.

Device 101 comprises a processor 120 interconnected with a memory 122, communications interfaces 124-1, 124-2, 124-3, 124-4, a display 126 and an input device 128, and optionally a microphone 130 and speaker 132. Communications interfaces 124-1, 124-2, 124-3, 124-4 will be interchangeably referred to hereafter respectively as interface 124-1, interface 124-2, interface 124-3, and interface 124-4. Further, communications interfaces 124-1, 124-2, 124-3, 124-4 will be interchangeably referred to generically as an interface 124, and collectively as interfaces 124.

It is further appreciated that each interface 124-1, 124-2, 124-3, 124-4 can be used by device 101 to access network 105 via a respective link 140-1, 140-2, 140-3, 140-4 to a respective access point 107-1, 107-2, 107-3, 107-4. Further, each access point 107-1, 107-2, 107-3, 107-4 is in communication with network 105 via a respective link 142-1, 142-2, 142-3, 142-4.

Links 140-1, 140-2, 140-3, 140-4 will collectively be referred to hereafter as links 140 and generically as a link 140. Similarly, links 142-1, 142-2, 142-3, 142-4 will collectively be referred to hereafter as links 142 and generically as a link 142.

In general, device 101 is enabled to: transfer a data file via at least one communications network on at least a first communications interface 124 and second communications interface 124. For example, transfer of a data file can be one or more of an upload of a data file from device 101 to device 103, and download of a data file from at least one device 103 to device 101. Transfer of a data file using more than one interface 124 will be described in further detail hereafter.

Device 101 can be any type of electronic device that can be used in a self-contained manner to transfer data files via network 105. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

Similarly, device 103 can be any type of electronic device that can be used in a self-contained manner to transfer data files via network 105, for example a transfer of data files between device 101 and device 103. Device 103 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, Internet-enabled appliances and the like. Other suitable devices are within the scope of present implementations.

Each access point 107 can comprise any suitable access point to network 105, including but not limited to any suitable combination of wired and/or wireless access points, wireless devices, cell-phone access points, cellular network access points (including but not limited to 2G, 2.5G, 3G, 4G+, and the like), WiFi access points, WiMax access points, packet based access points, Internet access points, modems, analog network access points, PSTN (public switched telephone network) access points, and the like.

It is further appreciated that in specific depicted example implementations: access point 107-1 comprises a wired modem, hence access point 107-1 comprises a wired access point; access point 107-2 comprises a WiFi access point; access point 107-3 comprises a cellular network access point; and access point 107-4 comprises a device in communication with device 101 via a Bluetooth™ protocol and hence access point 107-4 comprises a near field communication (NFC) access point.

It is further appreciated that each access point 107 is in communication with device 101 via respective suitable links 140. Each link 140 comprises any suitable link for enabling device 101 to communicate with a respective access point 107. Each link 140, can hence include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth™ links, NFC (near field communication) links, WiFi links, WiMax links, packet based links, the Internet, analog networks, the PSTN (public switched telephone network), access points, and the like, and/or a combination.

It is further appreciated that in specific depicted non-limiting example implementations: link 140-1 comprises a cable connecting device 101 with access point 107-1; link 140-2 comprises a wireless WiFi link; link 140-3 comprises a wireless cellular network link; link 140-4 comprises a wireless NFC link (e.g. a Bluetooth™ link).

It is further appreciated that each access point 107 is in communication with network 105 via a suitable corresponding link 142, each of which can comprise any suitable respective combination of wired and/or wireless links, wired and/or wireless devices and/or wired and/or wireless networks, including but not limited to any suitable combination of cables, cell-phone links, cellular network links (including but not limited to 2G, 2.5G, 3G, 4G+, and the like) wireless data, Bluetooth™ links, NFC (near field communication) links, WiFi links, WiMax links; packet based links, the Internet, analog networks, the PSTN (public switched telephone network), access points, and the like, and/or a combination.

It is further appreciated that in specific depicted non-limiting example implementations: each link 142-1, 142-2, 142-4 comprises any suitable respective links between access point 107-1, 107-2, 107-4 and network 105, including wired and/or wireless link as desired, and any suitable communications networks there between; and link 142-3 comprises a cellular network backhaul to network 105.

It is yet further appreciated that not all links 140 need be active at the same time. For example, in given implementations, as described below, at least two links 140 are active for described implementations. In other words, in present implementations, device 101 can be in communication with network 105 via two or more of access points 107 and corresponding links 140.

It is appreciated that FIG. 1 further depicts a schematic diagram of device 101 according to non-limiting implementations. It should be emphasized that the structure of device 101 in FIG. 1 is purely an example, and contemplates a device that can used for both wireless voice (e.g. telephony) and wireless data communications (e.g. email, web browsing, text, and the like). However, while FIG. 1 contemplates a device that can be used for telephony, in other implementations, device 101 can comprise a device enabled for implementing any suitable specialized functions, including but not limited to one or more of telephony, computing, appliance, and/or entertainment related functions.

Device 101 comprises at least one input device 128 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

In particular, it is appreciated that memory 122 stores an application 123 that, when processed by processor 120 enables processor 120 to: transfer a data file via at least one communications network 105 on a first communications interface 124 and a second communications interface 124.

Further, application 123 can comprise an application that is processed at an application layer at device 101.

In a non-limiting example, application 123 can be implemented at the application layer of the OSI (Open Systems Interconnection) model, which generally comprises: a physical layer, a data link layer, a network layer, a transport layer, a session layer, a presentation layer and the application layer.

In a further non-limiting example, application 123 can be implemented at the application layer of the TCP/IP (transmissions control protocol/Internet protocol) model, which generally comprises: a link layer, an Internet layer, a transport layer, and the application layer.

However, the model used for defining the application layer as presently described is generally appreciated to be non-limiting; rather it is appreciated that application 123 can be used to manage transfer of a data file using more than one of interfaces 124.

Further, application 123 generally enables network adapter bonding at an application layer (e.g. taking two network adapters, such as interfaces 124, and combining them into a single network interface).

Processor 120 in turn can also be configured to communicate with a display 126, and optionally a microphone 130 and a speaker 132. Display 126 comprises any suitable. one of or combination of CRT (cathode ray tube) and/or flat panel displays (e.g. LCD (liquid crystal display), plasma, OLED (organic light emitting diode), capacitive or resistive touchscreens, and the like). Microphone 130, when present, comprises any suitable microphone for receiving sound data. Speaker 132, when present, comprises any suitable speaker for providing sound data, audible alerts, audible communications from remote communication devices, and the like, at device 101.

In some implementations, input device 128 and display 126 are external to device 101, with processor 120 in communication with each of input device 128 and display 126 via a suitable connection and/or link.

Processor 120 also connects to interfaces 124, each of which can be implemented as one or more radios and/or connectors and/or network adaptors, configured to communicate with respective access points 107. In general, it will be appreciated that each interface 124 is configured to correspond with the network architecture that is used to implement a respective access point 107. For example, each of interfaces 124-2, 124-3, 124-4 can comprise a wireless interface enabled to communicate with respective access points 107-2, 107-3, 107-4 including but not limited to any suitable combination of wireless devices, wireless access interfaces, cell-phone interfaces, cellular network interfaces (including but not limited to 2G, 2.5G, 3G, 4G+ interfaces, and the like), WiFi interfaces, WiMax interfaces, packet based interfaces, Internet interfaces, analog network interfaces, PSTN (public switched telephone network) interfaces, and the like.

Further, interface 124-1 can comprise a wired interface enabled to communicate with access point 124-1, including but not limited to any suitable combination of cable interfaces, packet based interfaces, Internet interfaces, analog network interfaces, PSTN (public switched telephone network) interfaces, and the like.

In particular, it is appreciated that each interface 124 is different from each other interface 124.

Indeed, it is appreciated that in specific depicted non-limiting example implementations, interface 124-1 comprises a suitable connector and interface for accepting a cable to connect with wired access point 107-1, interface 124-2 comprises a WiFi radio, interface 124-3 comprises a cell-phone radio, and interface 124-4 comprises an NFC radio (including, but not limited to a, Bluetooth™ radio).

In any event, it is appreciated that any suitable combination of interfaces is within the scope of present implementations.

Further, it should be understood that in general a wide variety of configurations for device 101 are contemplated.

Figure 2:
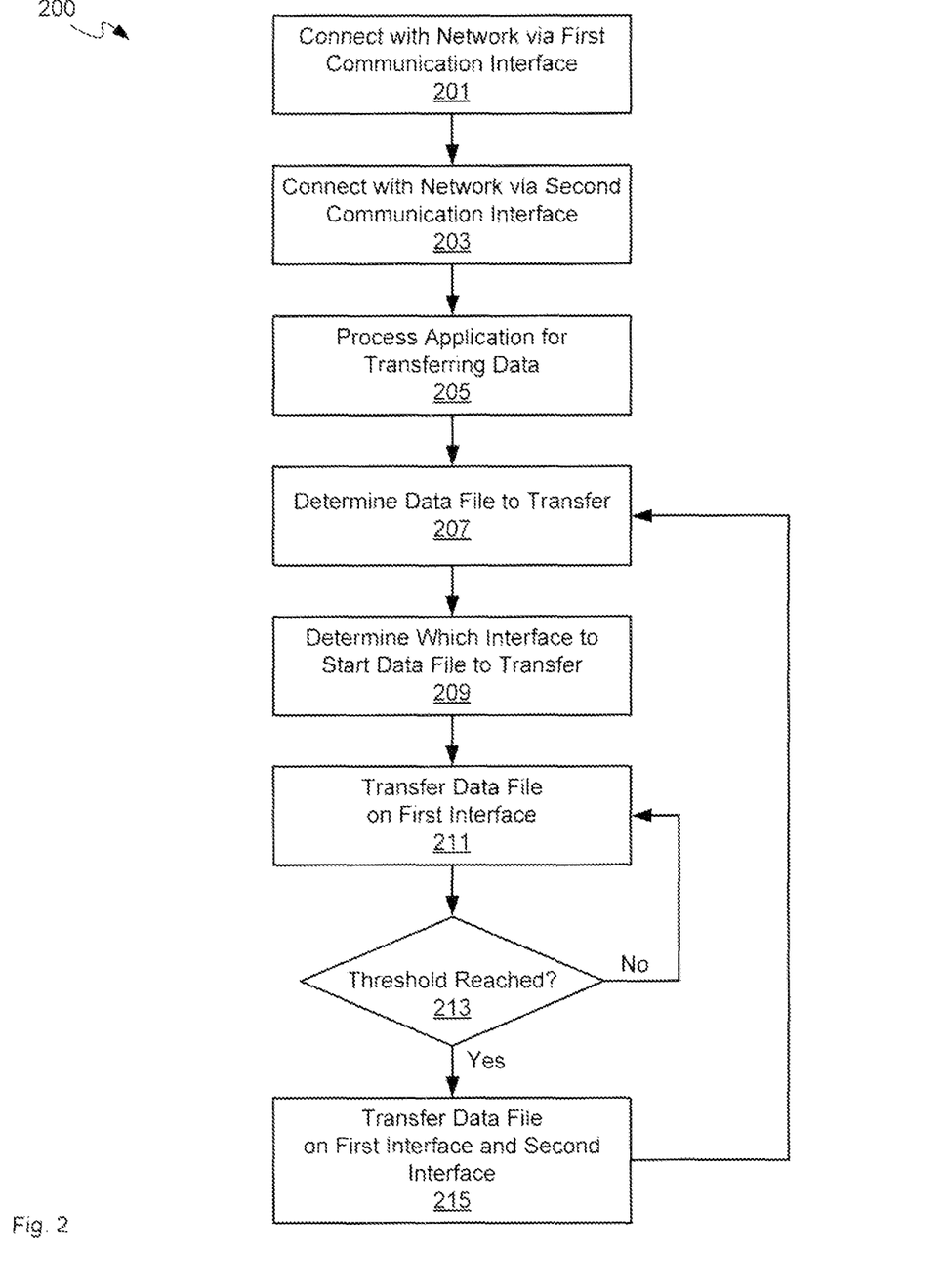
FIG. 2 depicts a flowchart of a method for transferring data via more than one communications interface, according to non-limiting implementations.

Hence attention is now directed to FIG. 2 which depicts a flowchart of a method 200 for transferring data via more than one communications interface, according to non-limiting implementations. In order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present implementations.

It is appreciated that, in some implementations, method 200 is implemented in system 100 by processor 120 of device 101. Indeed, method 200 is one way in which device 101 can be configured. It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of system 100 as well.

Figure 3:
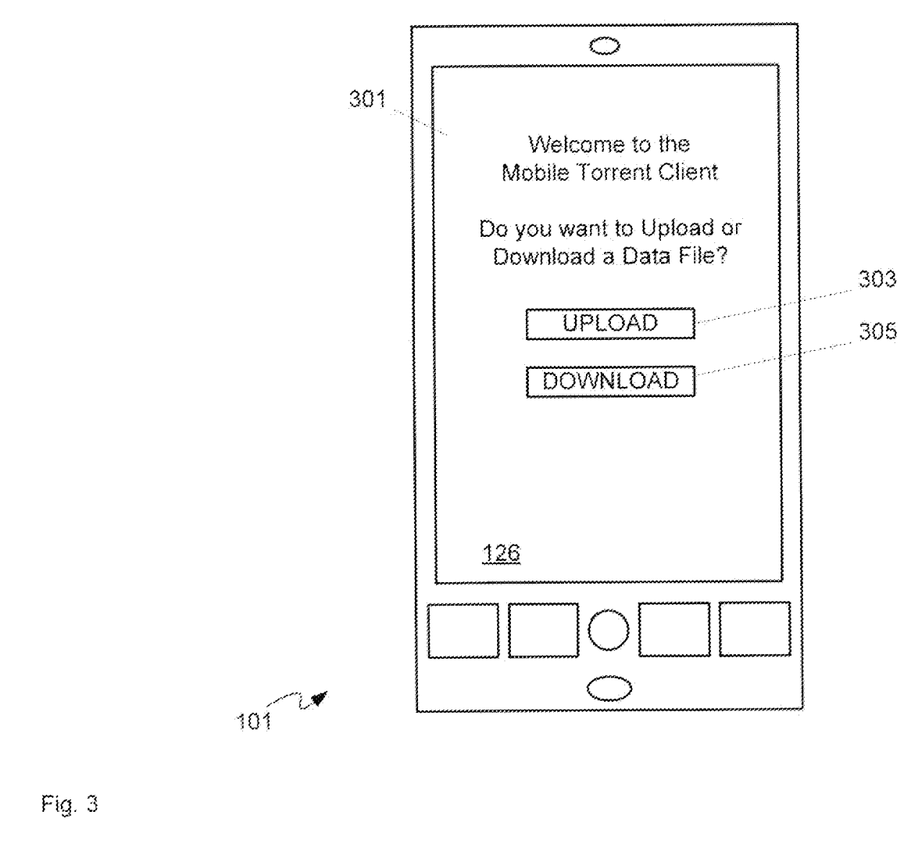
FIG. 3 depicts a Graphic User Interface for selecting a transfer mode of the system of FIG. 1, according to non-limiting implementations.
Figure 4:
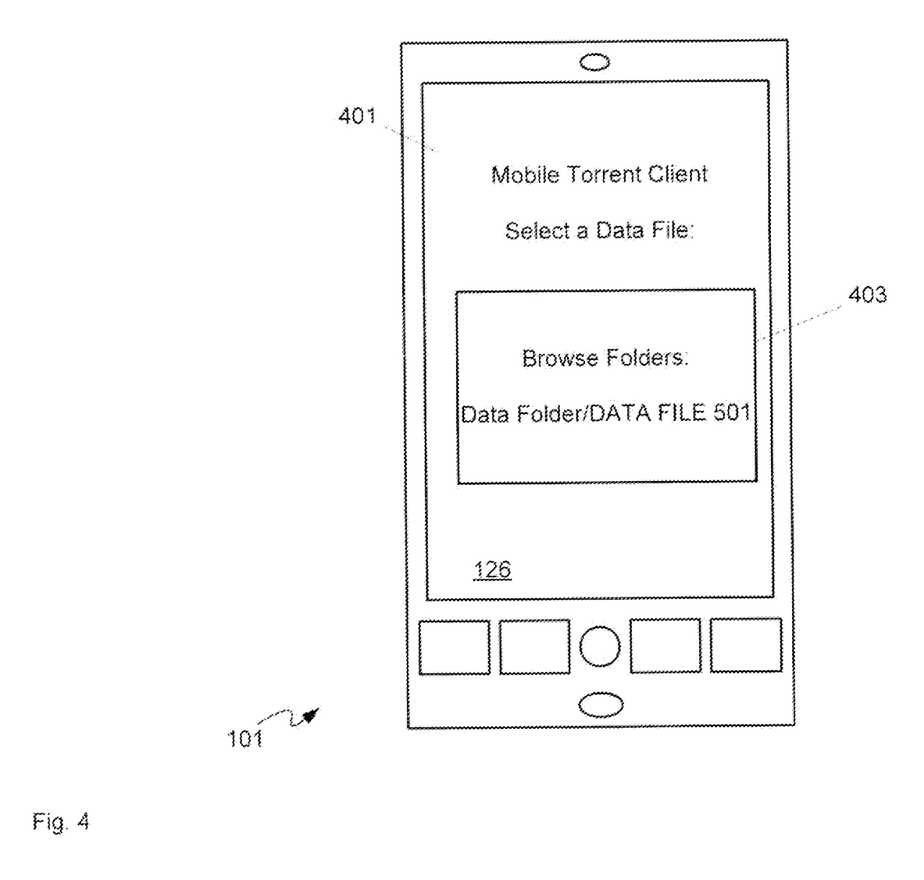
FIG. 4 depicts a Graphic User Interface for selecting a data file for transfer in the system of FIG. 1, according to non-limiting implementations.

Further, the following discussion of method 200 will be done with reference to FIGS. 3 and 4, each of which depict graphic user interfaces (GUIs) associated with application 123, and FIGS. 5 to 8, each of which are substantially similar to FIG. 1 with like elements having like numbers. It is further appreciated that the following discussion of method 200 will occur with respect to transferring data via two of interfaces 124, for example interfaces 124-2, 124-3, but that any suitable combination of interfaces 124 are within the scope of present implementations.

At block 201, processor 120 connects with network 105 via a first communications interface 124, for example interface 124-2. At block 203, processor 120 connects with network 105 via a second communications interface, for example interface 124-3. In other words, it is assumed in non-limiting examples that device 101 is in wireless communication with network 105 via a WiFi connection (e.g. via link 140-2 and access point 142-2) and a cellular connection (e.g. via link 140-3 and access point 142-3). Furthermore, each of blocks 201, 203 can include, but is not limited to, turning a respective interface 124 on (i.e. when a given interface 124 is not already on).

At block 205, processor 120 processes application 123 to commence transfer of data. As described above, application 123 is for managing the transfer of a data file on at least a first communications interface 124 and a second communications interface 124. Furthermore, via processing of application 123, processor 120 is enabled to manage the transfer of a data file on at least a first communications interface 124 and a second communications interface 124 at an application layer of device 101.

In specific non-limiting implementations, transfer of data files occurs according to a torrent protocol, such as a bit torrent protocol and the like, and hence application 123 can comprise a torrent client. Alternatively, transfer of data files can occur according to a packet protocol, and hence application 123 can comprise a client for transmitting packets. It is appreciated that a combination of torrent protocols, packet protocols, and the like, are within the scope of present implementations.

In any event, at block 207, a data file to be transferred is identified. It is appreciated that method 200 can be implemented at system 100 according to at least two modes: uploading of a data file to network 105, and ultimately, for example, to device 103; and downloading of a data files from network 105, for example from at least one remote device, such as device 103. The mode of operation and selection of a data file can occur via processing of application 123. Hence, at block 207, the mode of operation of system 100 can also be determined.

For example, attention is directed to FIG. 3, which depicts a perspective view of device 101 and a rendering 301 of application 123 at display 126, which provides selectable options to upload or download a data file via respective virtual buttons 303, 305. Each of virtual buttons can be selected via receipt of input device 128, the input data indicative of selection of one or more of virtual buttons 303, 305.

Figure 5:
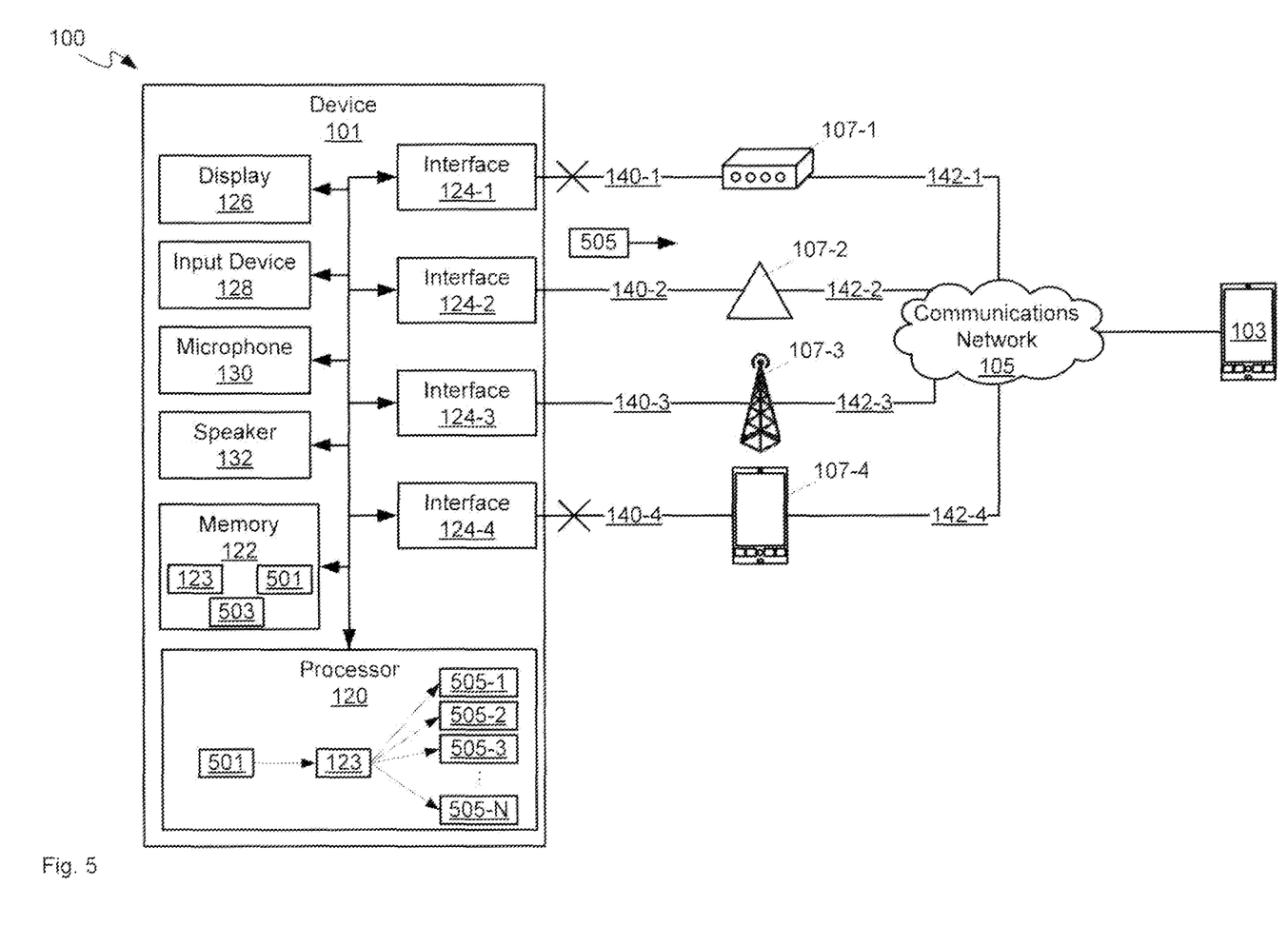
FIG. 5 depicts the system of FIG. 1 with a data file first being uploaded to a network on a first communications interface, according to non-limiting implementations.

Once an upload or download mode is selected, the data file to be transferred is determined: for example, attention is directed to FIG. 4, which depicts a perspective view of device 101 and a further rendering 401 of application 123 at display 126, which provides an interface 403 for selecting a data file. When an upload mode is selected (e.g. virtual button 303 is selected), rendering 401 provides interactive interface 403 for browsing memory 122 to select a data file, for example a data file 501 stored at memory 122, as depicted in FIG. 5 (substantially similar to FIG. 1, with like elements having like numbers). Alternatively, interface 403 can comprise any suitable combination of pull down menus, virtual buttons and the like for selecting a data file.

It is further appreciated that when a download mode is alternatively selected (e.g. virtual button 305 is selected at rendering 301 of FIG. 3), a further rendering of an interface of application 123 which enables a network search for data files to be downloaded; indeed, when application 123 comprises a torrent client, such an interface enables a search for torrent files on network 105, including but not limited to available data files stored at device 103.

It is further appreciated that in other implementations, application 123 can include a message client, including, but not limited to, an email client, an SMS (short message service client) and the like. In these implementations, selection of a data file for transfer (e.g. upload or download) can occur via the message client, and data file 501 comprises a message to be transferred (e.g. transmitted/or received) and/or associated attachments. In other words, method 200 can be implemented at a message client (and/or as an add-on thereto) to manage transfer of messages, and/or associated attachments, using more than one of interfaces 124.

Returning to FIG. 2, at block 209 it is determined which interface 124 is to be used to first transfer data file 501. It is appreciated that processor 120 can be enabled to determine which interface 124 to first transfer the data file based on one or more of: a priority list 503 of communications interfaces 124, priority list 503 stored at memory 122, as depicted in FIG. 5; respective quality of service (QOS) metrics associated with each interface 124; respective speeds of transfer associated with each interface 124; and respective costs of transfer associated with each interface 124. Indeed, list 503 can be based on one or more of respective speeds of transfer associated with each interface 124 and respective costs of transfer associated with each interface 124.

List 503 can be generated by processor 120 based on QOS metrics received from access points 107 and/or network providers, including but not limited to cost, speed, numbers of dropped packets, and the like. In some implementations, list 503 can be provisioned at memory 122 at a factory and/or by a service provider.

In any event, list 503 can be dynamic and maintained by processor 120 as different access points 107 and/or connections to network 105 are added and/or removed from system 100, and/or as updated QOS metrics are received from network elements (not depicted) in network 105, such as a QOS server, and the like, associated with a service provider.

In some implementations, list 503 can be specific to each interface 124 associated with respective access points 107: for example, a user can have an unlimited mobile cellular data plan with relatively fast data transfer rates, and hence interface 124-1 can be given priority at list 503. In other implementations, list 503 can be generic, and based on specific assumptions: for example that wired interfaces provide the cheapest and fastest data transfers, while cellular interfaces provide the slowest and most expensive data transfers. In either case, as updated QOS metrics are received at device 101, list 503 can be updated.

In specific non-limiting implementations, list 503 can comprise a list of identifiers of each interface 124 in a given order indicative of priority, for example: "Interface 124-1, interface 124-2, interface 124-3, interface 124-4". Hence, in this implementation, a wired interface 124-1 is assigned highest priority, a WiFi interface 124-2 is assigned second highest priority, a cellular interface 124-3 is assigned third highest priority and an NFC interface 124-4 is assigned lowest priority. The NFC interface 124-4 is assigned lowest priority, this non-limiting example, based on the following assumptions: transfer over interface 124-4 will occur via QOS metrics, data transfer rates and costs associated with access point 107-4, which in turn can have a wired, WiFi, and/or cellular link 142-4 with network 105; as the QOS metrics, costs and data transfer rates associated with link 142-4 can be unknown to device 101 (and indeed, a user of device 101 may not be charged for any high cost transfers), it is assumed in these implementations, that costs can be high and/or unknown, and hence interface 124-4 is given low priority.

However, the priority of interfaces 124 is not to be considered particularly limiting, and any interface 124 can be assigned a suitable priority.

Furthermore, the actual format of list 503 is not be considered particularly limiting and interfaces 124 can be assigned priority in any suitable manner; for example while present implementations assume an order of interfaces 124 at list 503 is reflective of priority, in other implementations, interfaces 124 can be provided in any suitable order and priority indicated in any suitable manner.

Furthermore, a priority of interfaces 124 need not be maintained using a list; rather any suitable maintenance of priority of interfaces 124 is within the scope of present implementations, including a database and the like.

In any event, with further reference to FIG. 5, it is assumed in present example implementations, that links 124-1, 124-4 are not available (e.g. device 101 comprises a mobile device presently not wirelessly connected to access point 107-1, and presently not in NFC communication with, access point 107-4). Indeed, in some of these implementations, interfaces 124-1, 124-4 can be off.

Hence, returning to FIG. 2, at block 209, processor 120 processes list 503, or the like, and determines that as the highest priority interface 124-1 is not available to transfer data, transfer of data file 501 is to first occur using next highest priority interface 124-2. To determine that interface 124-1 is not available, processor 120 can one or more of: determine whether interface 124-1 is on; if not, processor 120 can determine that interface 124-1 is not available or turn interfaces 124-1 on; when interface 124-1 is on, processor 120 can attempt to contact access point 107-1 and determine that access point 107-1 is not available, for example when no response is received there from when interface 124-1 attempts to establish link 140-1. In some implementations, a similar process can occur for each interface 124.

In any event, once processor 120 determines at block 209 that interface 124-2 is to be used to first transfer data file 501, at block 211 data transfer of data file 501 commences. With further reference to FIG. 5, when the transfer of data file 501 comprises an upload of data file 501 to target device 103 via network 105, processor 120 breaks data file 501 into chunks 505-1, 505-2, 505-3 . . . 505-N, for example as occurs in a torrent client and/or with a packet based client. Chunks 505-1, 505-2, 505-3 . . . 505-N will interchangeably be referred to hereafter generically as a chunk 505 and collectively as chunks 505. Furthermore, when interface 124-2 is not on, processor 120 can turn interface 124-2 on at block 211 (e.g. block 201 does not occur until block 211 occurs). Furthermore, chunks 505 can be of any suitable size and format, as determined via application 123: for example a size and format compatible with one or more of a torrent protocol and a packet protocol.

It is further appreciated that chunks 505 are transmitted to device 103: for example, a network identifier associated with device 103 can be received at application 123 via one or more of input device 128, a network identifier database accessible to device 101, and the like. Hence, in the data transfer, chunks 505 can be transmitted with the network identifier associated with device 103. It is appreciated in these implementations that device 103 receiving chunks 505 is enabled to assemble chunks 505 into a copy of data file 501.

Furthermore, it is appreciated that not all chunks 505 are transmitted simultaneously, but in series according to any suitable order, for example as determined via processor 120 processing application 123, for example in packets and/or according to a torrent protocol.

Returning to FIG. 2, at block 213, processor 120 first transfers data file 501 by transmitting chunks 505 on interface 124-2 until a respective threshold is reached, including but not limited to a threshold data transfer rate. For example each interface 124 can be associated with a saturation data transfer rate (e.g. the maximum amount of data per second that can be transferred via a given interface 124 and/or a respective access point 107 and/or respective links 140, 142). The threshold can hence comprise the saturation data transfer rate or a given percentage thereof.

In any event, when the threshold is not reached (i.e. a "No" decision at block 213), data transfer continues as at block 211.

Otherwise when the threshold is reached (i.e. a "Yes" decision at block 213), at block 215 processor 120 transfers data file 501 by transmitting chunks 505 on both interface 124-2 and interface 124-3 (i.e. the next available interface 124 with the next highest priority at list 503). Data transfer of chunks 505 can occur simultaneously on interfaces 124-2, 124-3, in parallel on interfaces 124-2, 124-3, and/or in a series on interfaces 124-2, 124-3 as determined by processor 120. For example, processor 120 can alternate between transmitting chunks 505 on a first interface 124-2 and a second interface 124-3.

In other words, at block 215, processor 120 transfers data file 501 on the first communications interface 124-2 and the second communications interface 124-3 by transferring respective chunks 505 of data file 501 via the first communications interface 124-2 and the second communications interface 124-3.

Figure 6:
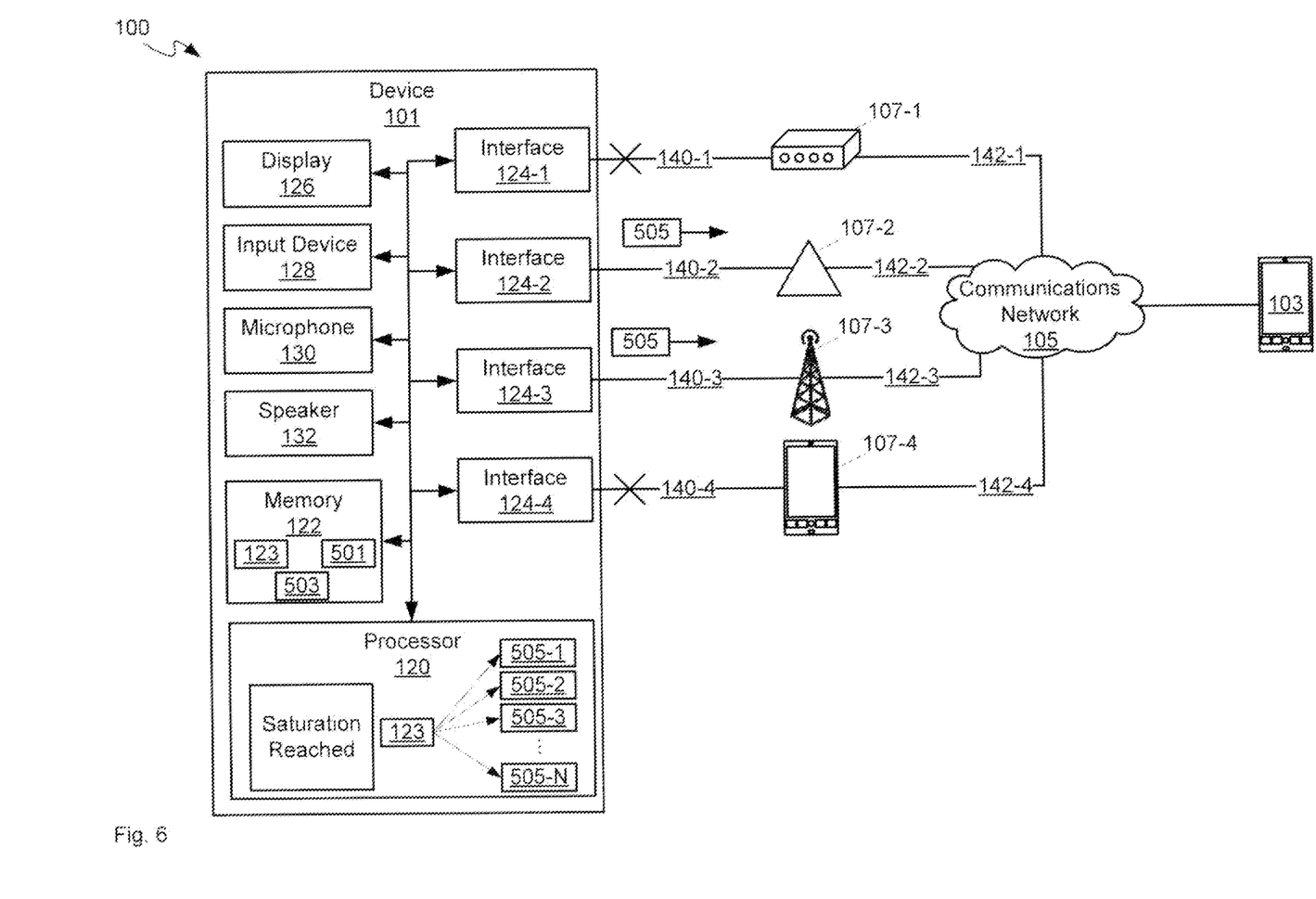
FIG. 6 depicts the system of FIG. 1 with a data file first being uploaded to a network on two communications interfaces, according to non-limiting implementations.

In example implementations, as depicted in FIG. 6, processor 120 determines that the threshold at interface 124-2 has been reached (such as saturation or a percentage thereof) and transfers data file 501 on interface 124-2 and interface 124-3, for example by transmitting chunks 505 on interfaces 124-2, 124-3. When interface 124-3 is not on, processor 120 can turn interface 124-3 on at block 215 (e.g. block 203 does not occur until block 215 occurs).

Again, it is appreciated that not all chunks 505 are transmitted at once, but according to any suitable order, for example in packets and/or according to a torrent protocol. The order can be determined via processor 120 processing application 123. It is furthermore appreciated that chunks 505 already transmitted are not retransmitted, hence only remaining chunks 505 are transmitted, unless application 123 allows for redundancy and/or requests for missing chunks from device 103.

It is appreciated that processor 120 can further determine when other interfaces 124 become available. For example, during the data transfer, one or more of interfaces 124-1, 124-4 could become available. In these implementations, processor 120 can transfer data file 503 on each available interface 124. Indeed, presuming a higher priority interface 124 becomes available (e.g. link 140-1 is established between interface 124-1 and access point 107-1 while one or more of blocks 211-215 are occurring), data transfer on a lower priority interface 124 (e.g. interface 124-3) can stop and a data transfer on the higher priority interface 124-1 can occur. Alternatively, data transfer at both interfaces 124-2, 124-3 can stop until data transfer at interface 124-1 reaches a threshold. In yet further implementations, data transfer can occur on all three of interfaces 124-1, 124-2, 124-3.

In yet further implementations, when three or more interfaces 124 are available, data transfer can occur on a first interface 124-1 until a first threshold (associated with the first interface 124-1) is reached, and then occur on a first interface 124-1 and a second interface 124-2 until a second threshold (associated with the second interface 124-2) is reached, and then occur on a first interface 124-1, a second interface 124-2, and a third interface 124-3. When a fourth interface 124-4 is available, and a third threshold (associated with the third interface 124-3) is reached, data transfer can occur on a first interface 124-1, a second interface 124-2, a third interface 124-3, and a fourth interface 124-4. Indeed, it is appreciated that when a threshold is reached at a given interface 124, data transfer can occur at the given interface 124 and a further interface 124.

Returning to FIG. 2, it is appreciated that in some implementations, blocks 209-213 can be optional. In other words, rather than begin data transfer on a first interface 124 until a threshold is reached, data transfer initially occurs at both a first interface 124 and a second interface 124, under control of application 123 at an application layer.

Figure 7:
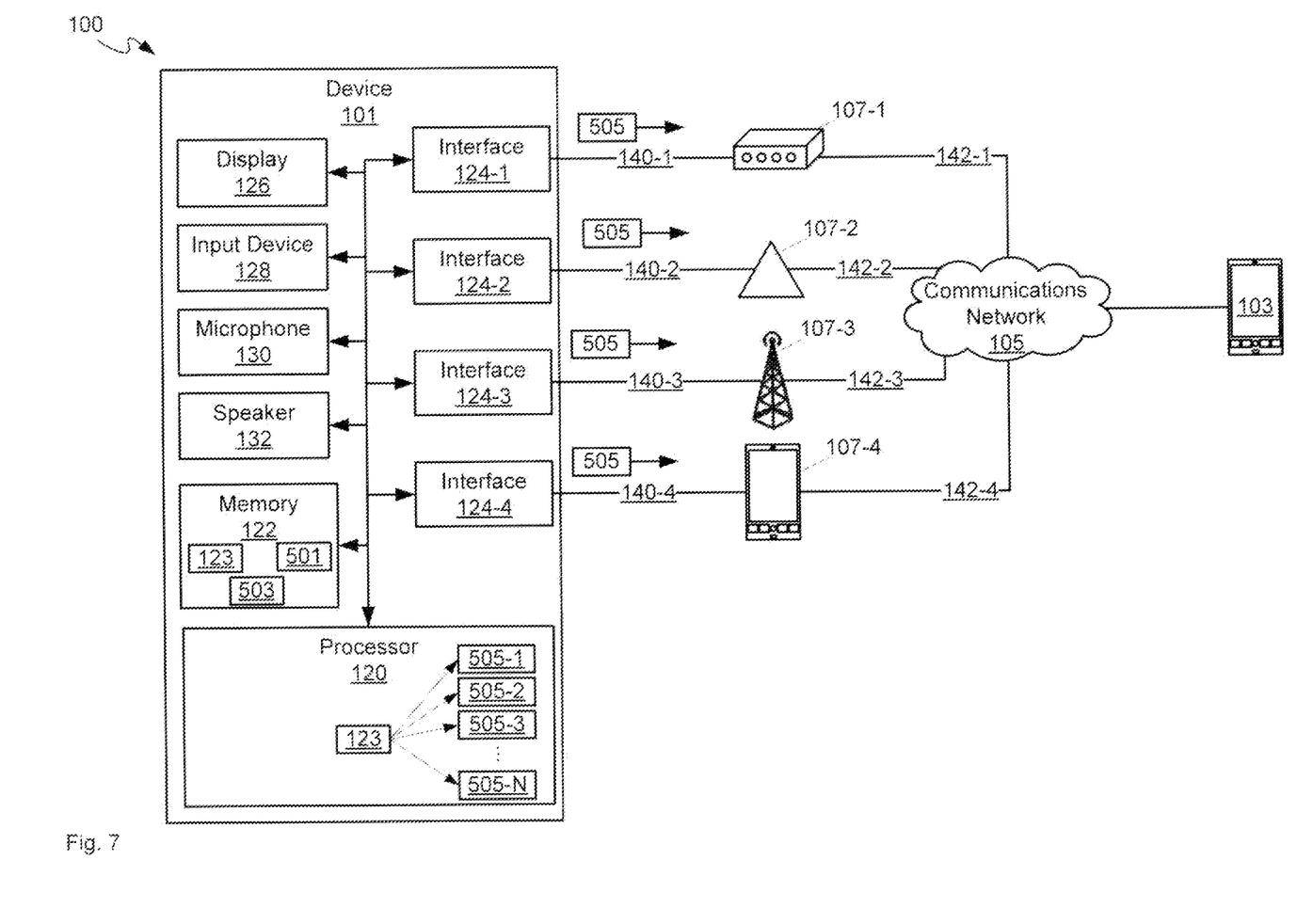
FIG. 7 depicts the system of FIG. 1 with a data file first being uploaded to a network on four communications interfaces, according to non-limiting implementations.

Furthermore, when all of interfaces 124 are available, data transfer can occur on all of interfaces 124, as depicted at FIG. 7, where data file 501 is transferred by transmitting chunks 505 via all of interfaces 124, as described above. Such a data transfer can occur without regard to priorities of interfaces 124; indeed, in these implementations, and indeed any implementations where blocks 209 to 213 do not occur, list 503 and the like is appreciated to be optional.

In yet further implementations, blocks 201, 203 can occur before, after or during any suitable block of method 200. For example, blocks 201, 203 can occur at block 211 and/or at block 215: in other words, a given interface 124 is not turned on, and/or an associated link 140 is not established, until data transfer is to commence.

It is also appreciated that when one of interfaces 124, links 140 and/or access points 107 fails and/or turns off and/or being used for a data transfer becomes inoperative and/or inactive, that data transfer can continue on the other active interface and/or active interfaces.

Heretofore, only data transfers comprising uploading have been discussed. Hence attention is directed to FIG. 8, which depicts system 100 in a downloading mode. It is assumed in FIG. 8 that downloading is to occur (e.g. virtual button 305 of FIG. 3 has been selected) and that a data file 801 for downloading has been identified, for example via a network search as described above and/or via identification of a message and/or an associated attachment for downloading. It is further appreciated that blocks 201 to 213 have been implemented and all four interfaces 124 are available for a data transfer. Hence, FIG. 8 assumes that block 215 is occurring and hence chunks 805-1, 805-2, 805-3 ... 805-N (interchangeably hereafter referred to generically as a chunk 805 and collectively as chunks 805) of data file 801 are being transferred from one or more devices, including device 103, to device 101. For example copies of data file 801 can persist on more than one device in communication with network 105 and processor 120 can be enabled to receive chunks 805 from more than one of these devices.

Figure 8:
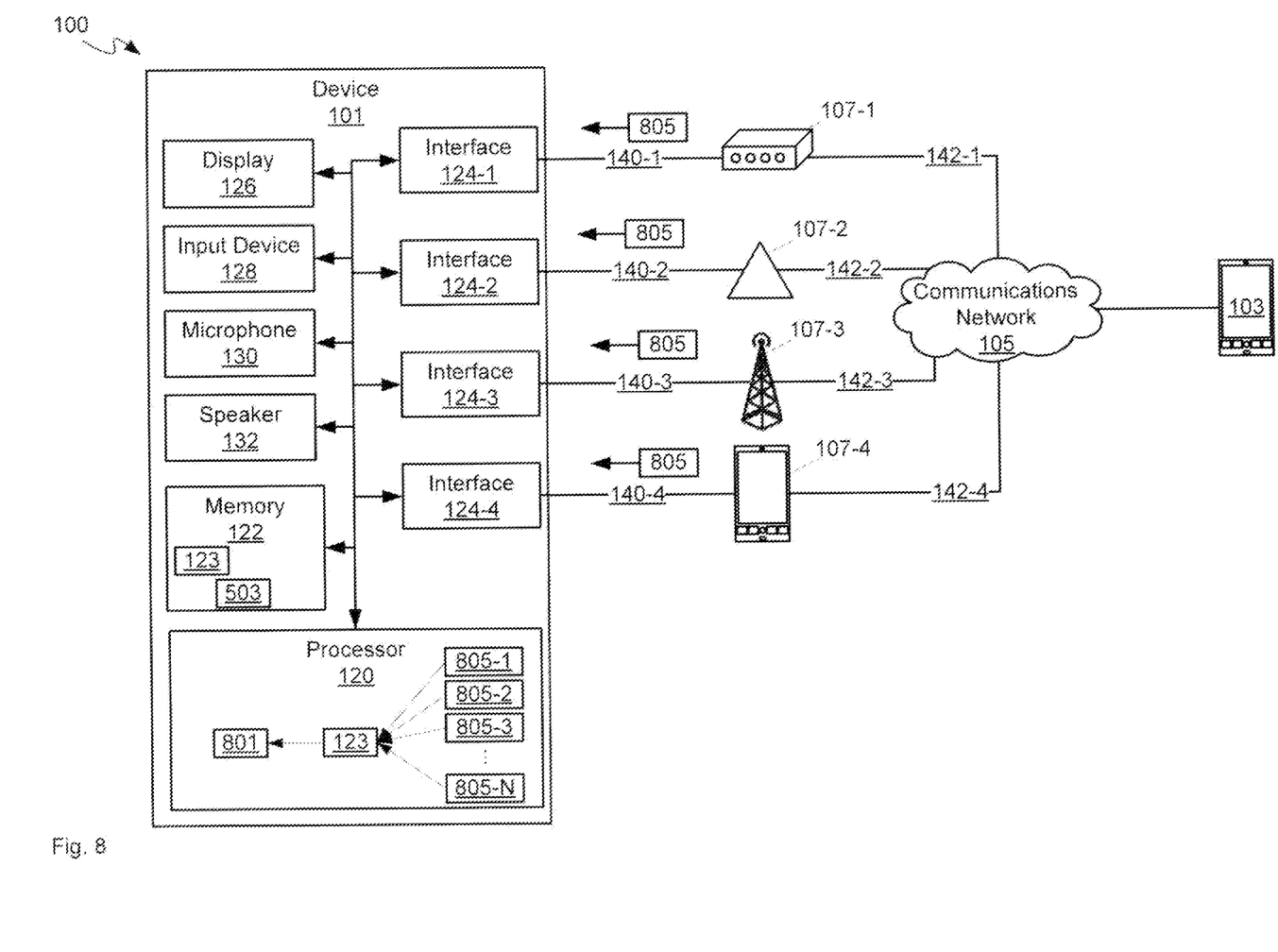
FIG. 8 depicts the system of FIG. 1 with a data file first being downloaded from a network on four communications interfaces, according to non-limiting implementations.

In any event, processor 120 is enabled to transfer data file 801 on at least two of interfaces 124 by transferring respective chunks 805 of data file 801 via respective interfaces 124, and further assemble the respective chunks 805 respective interfaces 124 into data file 801.

It is yet further appreciated that it is assumed in FIG. 8 that a mechanism for causing download of chunks 805 via two or more interfaces 124 has been implemented at system 100. For example, when requesting file 801 from device 103 (and/or a plurality of devices), device 101 can transmit a plurality of requests on each available interface 124 to device 103 (and any other similar devices), the plurality of requests for requesting that and device 103 and the like transmit respective chunks 805 on respective interfaces 124.

Alternatively, device 101 can transmit a single request to device 103, and the like, informing device 103, and the like, that a plurality of interfaces 124 are available to receive chunks 805 of data file 801; device 103, and the like (and/or a subset thereof) can be enabled to process the request and transmit chunks 805 accordingly via respective pathways that include each of interfaces 124.

Alternatively, a network element (not depicted), such as a server, can mediate the download, by receiving chunks 805 from device 103, and the like, and transmit chunks 805 to device 101 on available interfaces 124.

In any event, by transferring a data file via at least one communications network on at least a first communications interface and a second communications interface (e.g. by using a torrent protocol and the like) the data file can be broken into chunks, transferred separately and reassembled at a target device. Breaking a data file into chunks further enables use of multiple transport connections and protocols to transfer the data file. Hence, multiple chunks of the data file can be transferred over as many connections as can be established. Further, interfaces/connections can be prioritized and a least cost interface/connection (and/or a connection prioritized, based on QOS metrics) can be used first until saturated and then a next interface/connection.

It is further appreciated that implementation of data transfer using more than one interface at an application layer enables network adapter bonding at the application layer (e.g. taking two network adapters and combining them into a single network interface). In some implementations, torrent protocols, such as a bit torrent protocol, can be used as the binder. Further, QOS (quality of service) can be integrated at the application layer to use least cost interfaces/connections first before moving to higher cost bandwidth options.

Further, use of multiple interfaces, connections and/or pathways also reduces data transfer failures. For example, when a data transfer via interface fails, data transfer can continue via the alternate interface.

Those skilled in the art will appreciate that in some implementations, the functionality of devices 101 can be, implemented using pre-programmed hardware or firmware elements (e.g., application specific integrated circuits (ASICs), electrically erasable programmable read-only memories (EE-PROMs), etc.), or other related components. In other implementations, the functionality of 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a hardware processor, a first communications interface, and a second communications interface different from the first communications interface, the hardware processor configured to:
first transfer a data file via at least one communications network on the first communications interface until a respective threshold transfer rate is reached, the respective threshold transfer rate comprising one or more of a saturation data transfer rate and a percentage of the saturation data transfer rate, the saturation data transfer rate comprising a maximum amount of data per second that can be transferred via one or more of: the first communications interface, an access point respective to the first communications interface and one or more communications links respective to the first communications interface; and then,
transfer the data file on both the first communications interface and the second communications interface.

2. The device of claim 1, wherein the hardware processor is further configured to manage the transfer of the data file on the first communications interface and the second communications interface at an application layer of the device.

3. The device of claim 1, wherein the hardware processor is further configured to process an application for managing the transfer of the data file on the first communications interface and the second communications interface.

4. The device of claim 1, wherein the hardware processor is further configured to transfer the data file on the first communications interface and the second communications interface by transferring respective chunks of the data file via the first communications interface and the second communications interface.

5. The device of claim 4, wherein the transfer of the data file comprises an upload of the data file to a target device via the communications network and the hardware processor is further configured to break the data file into the respective chunks.

6. The device of claim 4, wherein the transfer of the data file comprises a download of the data file from at least one remote device via the communications network and the hardware processor is further configured to: assemble the respective chunks from the first communications interface and the second communications interface into the data file.

7. The device of claim 1, wherein the hardware processor is further configured to determine to first transfer the data file on the first communications interface based on one or more of:
a priority list of communications interfaces stored at a memory of the device;
respective quality of service (QOS) metrics associated with each of the first communications interface and the second communications interface;
respective speeds of transfer associated with each of the first communications interface and the second communications interface; and,
respective costs of transfer associated with each of the first communications interface and the second communications interface.

8. The device of claim 1, further comprising at least one further communications interface, and the hardware processor is further configured to transfer the data file on two or more of the first communications interface, the second communications interface, and the at least one further communications interface.

9. The device of claim 1, wherein each of the first communications interface, and the second communications interface comprises a respective radio.

10. The device of claim 1, wherein the transfer of the data file comprises a torrent protocol.

11. A method comprising:
first transferring a data file, using a hardware processor of a device, and via at least one communications network, on a first communications interface until a respective threshold transfer rate is reached, the respective threshold transfer rate comprising one or more of a saturation data transfer rate and a percentage of the saturation data transfer rate, the saturation data transfer rate comprising a maximum amount of data per second that can be transferred via one or more of: the first communications interface, an access point respective to the first communications interface and one or more communications links respective to the first communications interface; and then, transferring the data file on both the first communications interface and a second communications interface of the device, the second communications interface different from the first communications interface.

12. The method of claim 11, further comprising managing, at the hardware processor, the transfer of the data file on the first communications interface and the second communications interface at an application layer of the device.

13. The method of claim 11, further comprising processing, at the processing unit, an application for managing the transfer of the data file on the first communications interface and the second communications interface.

14. The method of claim 11, further comprising transferring, via the hardware processor, the data file on the first communications interface and the second communications interface by transferring respective chunks of the data file via the first communications interface and the second communications interface.

15. The method of claim 14, wherein the transfer of the data file comprises an upload of the data file to a target device via the communications network, the method further comprising breaking the data file into the respective chunks.

16. The method of claim 14, wherein the transfer of the data file comprises a download of the data file from at least one remote device via the communications network, the method further comprising assembling the respective chunks from the first communications interface and the second communications interface into the data file.

17. The method of claim 11, further comprising determining, at the hardware processor, to first transfer the data file on the first communications interface based on one or more of:

a priority list of communications interfaces stored at a memory of the device;

respective quality of service (QOS) metrics associated with each of the first communications interface and the second communications interface;

respective speeds of transfer associated with each of the first communications interface and the second communications interface; and, respective costs of transfer associated with each of the first communications interface and the second communications interface.

18. The method of claim 11, further comprising transferring, via the hardware processor, the data file on two or more of the first communications interface, the second communications interface, and at least one further communications interface of the device.

19. The method of claim 11, wherein the transfer of the data file comprises a torrent protocol.

20. A computer program product, comprising a non-transitory computer usable medium having a computer readable program code adapted to be executed to implement a method comprising:

first transferring a data file, using a hardware processor of a device, and via at least one communications network, on a first communications interface until a respective threshold transfer rate is reached, the respective threshold transfer rate comprising one or more of a saturation data transfer rate and a percentage of the saturation data transfer rate, the saturation data transfer rate comprising a maximum amount of data per second that can be transferred via one or more of: the first communications interface, an access point respective to the first communications interface and one or more communications links respective to the first communications interface; and then, transferring the data file on both the first communications interface and a second communications interface of the device, the second communications interface different from the first communications interface.

\* \* \* \* \*